United States Patent
Burris

Patent Number: 5,858,283
Date of Patent: *Jan. 12, 1999

[54] SPARGER

[76] Inventor: William Alan Burris, 7 E. Jefferson Cir., Pittsford, N.Y. 14534

[ * ] Notice: This patent issued on a continued prosecution application filed under 37 CFR 1.53(d), and is subject to the twenty year patent term provisions of 35 U.S.C. 154(a)(2).

[21] Appl. No.: 752,158

[22] Filed: Nov. 18, 1996

[51] Int. Cl.$^6$ ........................................... B01F 3/04
[52] U.S. Cl. .................... 261/122.1; 156/290; 261/122.2
[58] Field of Search ................ 261/122.2, 122.1, 261/124; 156/290; 4/541.5

[56] References Cited

U.S. PATENT DOCUMENTS

| | | |
|---|---|---|
| 1,176,428 | 3/1916 | Callow . |
| 1,319,646 | 10/1919 | Eccleston . |
| 1,547,548 | 7/1925 | Allen, Jr. et al. . |
| 1,642,051 | 9/1927 | Wall ..................................... 261/122.2 |
| 1,759,983 | 5/1930 | Houston . |
| 1,792,285 | 2/1931 | Curry et al. . |
| 1,792,286 | 2/1931 | Curry et al. . |
| 2,522,079 | 9/1950 | Winstead ................................. 156/290 |
| 2,769,779 | 11/1956 | Van Steenkiste et al. . |
| 2,962,409 | 11/1960 | Ludlow et al. .......................... 156/290 |
| 3,178,730 | 4/1965 | Bogar . |
| 3,259,049 | 7/1966 | Uithoven . |
| 3,505,083 | 4/1970 | Schelhorn ............................... 156/290 |
| 3,525,685 | 8/1970 | Edwards . |
| 3,997,634 | 12/1976 | Downs .................................. 261/122.2 |
| 4,029,581 | 6/1977 | Clough, Jr. et al. . |
| 4,048,266 | 9/1977 | Baumann . |
| 4,056,858 | 11/1977 | Weber .................................. 156/290 |
| 4,102,720 | 7/1978 | Kaneko et al. .......................... 156/290 |
| 4,469,736 | 9/1984 | Macholz ................................ 156/290 |
| 4,483,030 | 11/1984 | Flick et al. ............................. 156/290 |
| 4,624,781 | 11/1986 | Messner . |
| 4,761,324 | 8/1988 | Rautenberg et al. . |
| 4,935,287 | 6/1990 | Johnson et al. . |
| 5,000,884 | 3/1991 | Bassfeld . |
| 5,026,591 | 6/1991 | Henn et al. . |
| 5,036,551 | 8/1991 | Dailey et al. . |
| 5,054,473 | 10/1991 | Sandrin ..................................... 4/541.5 |
| 5,098,581 | 3/1992 | Roediger . |
| 5,192,467 | 3/1993 | Strunc et al. . |
| 5,422,043 | 6/1995 | Burris . |
| 5,482,859 | 1/1996 | Biller et al. . |
| 5,514,431 | 5/1996 | Shimomura . |
| 5,529,830 | 6/1996 | Dutta et al. . |

FOREIGN PATENT DOCUMENTS

| | | |
|---|---|---|
| 949239 | 6/1974 | Canada . |
| 17507 | 7/1913 | Denmark . |
| 0229386 | 7/1987 | European Pat. Off. ............ 261/122.2 |
| 2412441 | 9/1975 | Germany . |
| 688946 | 3/1953 | United Kingdom . |

OTHER PUBLICATIONS

"Fine Bubble Diffusers Increase Capacity, Lower Power Demands in 26-Yr.-Old Plant", WaterWorld, Nov./Dec. 1996, pp. 11 and 14.

Primary Examiner—Richard L. Chiesa
Attorney, Agent, or Firm—Eugene Stephens & Associates

[57] ABSTRACT

A large area sparger has a gas-permeable diffuser bonded to a gas-impermeable underlying element so that inflowing gas is distributed throughout a gap between the sparger and the underlying element. Bonding regions interconnect the diffuser and the underlying element around the sparger perimeter and throughout a gap region within the perimeter in a pattern that keeps the diffuser flat during operation and allows gas to flow around the bonding regions to reach all of the unbonded area of the diffuser. By giving the diffuser a liquid interface surface with a high surface energy, the gas passing through a finely porous diffuser departs from the diffuser interface surface and enters the liquid as very fine bubbles having a large area of contact with the liquid.

49 Claims, 2 Drawing Sheets

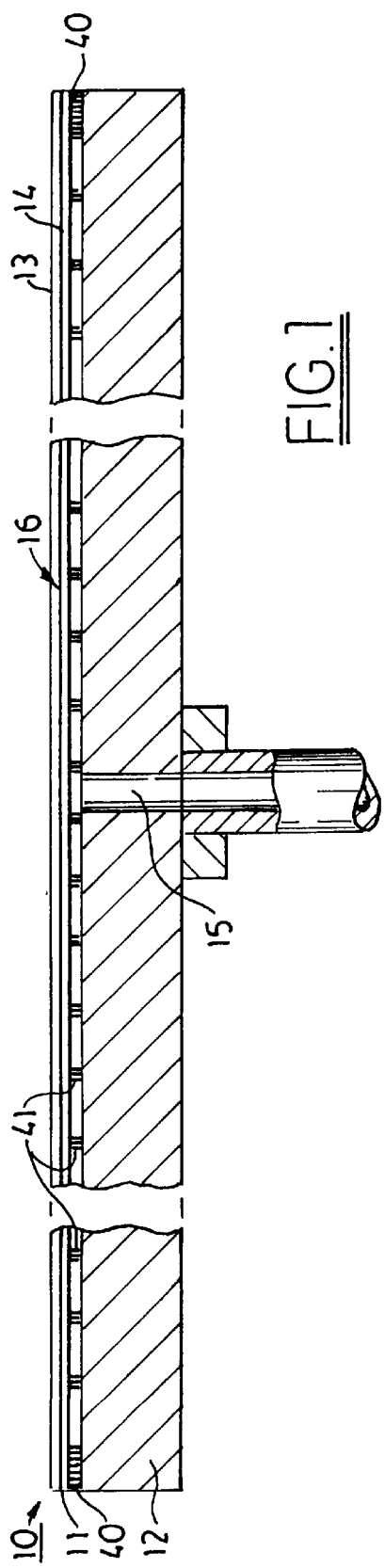
FIG. 1
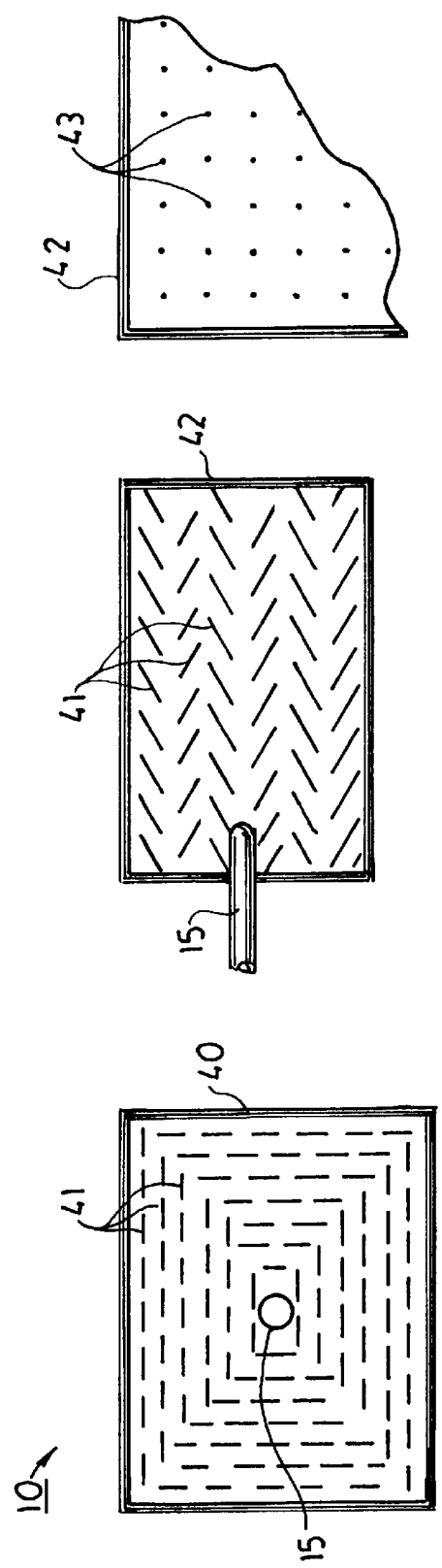
FIG. 4
FIG. 3
FIG. 2

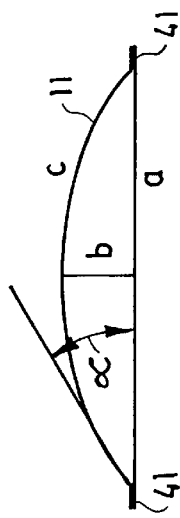
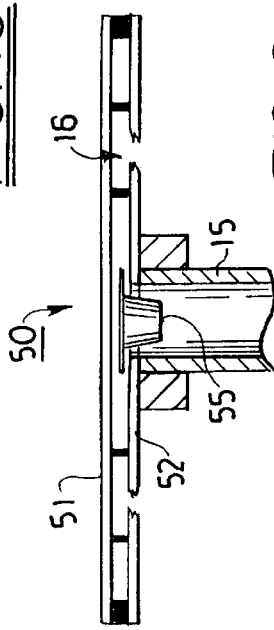
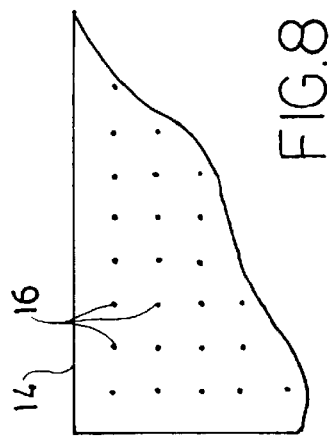
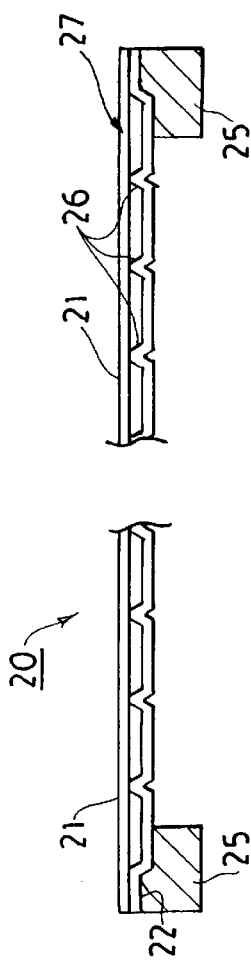
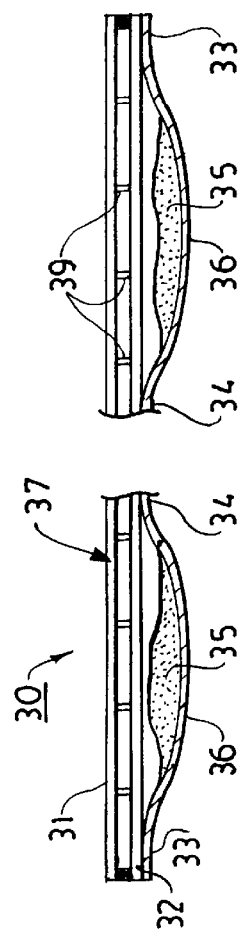
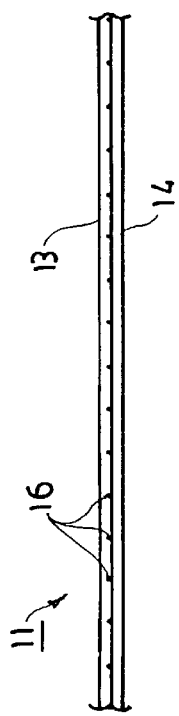

SPARGER

TECHNICAL FIELD

Sparger diffusers arranged for dispersing small gas bubbles into liquid.

BACKGROUND

My previous U.S. Pat. No. 5,422,043 disclosed an improvement in a sparger diffuser that efficiently distributes tiny gas bubbles into a liquid. It accomplishes this essentially with a gas-permeable diffuser having a high surface energy interface with the liquid allowing fine bubbles to depart from the interface surface and enter the liquid. The high surface energy interface is preferably backed up with a low surface energy material preventing liquid backflow and offering low resistance to gas through flow. For the details involved in accomplishing these effects with a thin and inexpensive diffuser, U.S. Pat. No. 5,422,043 is hereby incorporated by reference.

Scaling up a sparger so that its diffuser has a large surface area that can distribute fine bubbles throughout a large volume of liquid has required some other departures from the sparger art. It is desirable, for example, but difficult to ensure, that a sparger with a large area is not inflated and made buoyant during operation. If the diffuser of the sparger is made of two layers, which is often desirable, it is preferable that a satisfactory way be found for these to remain in contact with each other throughout the working area of the sparger. Billowing of the diffuser is to be avoided, as is anything that would make otherwise fine bubbles coalesce or merge into larger bubbles. Large spargers can also benefit from being made of flexible materials, so they are easy to handle. This invention addresses these and other problems to be solved in an efficient and low cost sparger having a large diffuser area.

SUMMARY OF THE INVENTION

Providing all the desired features in a sparger having a large surface area diffuser preferably involves a thin, flat gas-permeable diffuser bonded to an underlying layer that confines inflowing gas to the underside of the diffuser so that the gas passes only through the diffuser and into the liquid. The diffuser and the underlying layer are bonded together around a periphery of the sparger and in a short line or dot pattern of bonding regions arranged within the periphery. A gap between the diffuser and the underlying layer allows inflowing gas to spread around the bonding regions and throughout the area within the periphery so that most of the diffuser area is supplied with inflowing gas. The bonding regions are also kept to a minimum in area so as to block as little as possible of the diffuser area. Such a bonding arrangement can keep the diffuser substantially flat and nearly parallel with the underlying layer throughout the gap while the diffuser operates. In other words, this arrangement minimizes diffuser billowing and gap widening in response to inflowing gas. This has several advantages in diffuser operation, as explained below.

DRAWINGS

FIG. 1 is a partially schematic and partially cutaway elevational view of a preferred embodiment of a sparger according to the invention.

FIGS. 2–4 are partially schematic views of alternative patterns of dots and lines for bonding a diffuser to an underlying layer according to the invention.

FIGS. 5–6 are schematic elevational views of alternative embodiments of the inventive diffuser.

FIG. 7 is a schematic view of a pattern of tiny bonds between high and low surface energy layers of a diffuser preferred for use in the invention.

FIG. 8 is a schematic view of a dot pattern of tiny bonds disposed between the diffuser layers of FIG. 7.

FIG. 9 is a schematic elevational view of another alternative embodiment of the inventive diffuser.

FIG. 10 is a schematic view of maximum billowing of a diffuser permitted by the invention.

DETAILED DESCRIPTION

The sparger 10 of FIG. 1 schematically illustrates one preferred embodiment of the invention that includes a large area diffuser 11 bonded to an underlying element 12. Although many other alternatives are available, as explained below, diffuser 11, in the embodiment of FIG. 1, is formed of two gas-permeable layers 13 and 14, and the underlying, gas-impermeable layer 12 is formed of a rigid plastic or metal material.

The bonding between diffuser 11 and underlying layer 12 allows gas inflowing through inlet 15 to be dispersed widely around bonding regions and throughout an interlayer gap 16, 27, 37, where the gas is in contact with the underside of diffuser 11. The gas, which has no other escape, then passes through diffuser 11 and bubbles into a liquid in which sparger 10 is submerged. The preferred details and a few of the alternatives of such an arrangement are explained below.

Diffuser

For a large area sparger, diffuser 11 is preferably thin and flat as illustrated in FIG. 1. The upper surface of diffuser 11 provides an interface with liquid in which sparger 10 is submerged; and the interface surface preferably has a high surface tension or energy, of at least 46 dynes/cm, to ensure that bubbles departing into the liquid from the diffuser interface are made as tiny as possible. In the embodiment shown in FIG. 1, the high surface energy interface is provided by a layer 13 that is separate from an underlying layer 14. Interface layer 13 is preferably uniformly porous with a multitude of fine pores that distribute gas flow evenly and avoid excess gas flow through larger openings.

Upstream layer 14 has a low surface tension or energy, of preferably less than 46 dynes/cm, and very small and preferably uniform pores so that it resists liquid backflow and provides a moderately resistive path that is permeable to gas flow. The upstream layer 14, by providing some gas flow resistance combined with fine and uniformly distributed pores, effectively divides the gas flow into a multitude of tiny seeps. Upstream layer 14 also serves as a check valve resisting backflow of liquid through layer 13 if gas flow is stopped. Layer 14 additionally provides strength and structural support so that the combined and cooperating strength of layers 13 and 14 allows diffuser 11 to resist the applied gas pressure. More information on the preferred materials and characteristics for a double-layer diffuser 11 is set out in U.S. Pat. No. 5,422,043.

This desirable combination of characteristics minimizes the energy necessary to force gas through diffuser 11, while ensuring that the gas bubbles emitted from tiny pores in interface layer 13 are as small as possible. Dividing the through-flowing gas into the smallest bubbles ensures the largest contact area between the gas and the liquid as the bubbles rise. This in turn ensures the most efficient use of the gas being bubbled into the liquid.

It is also possible for diffuser 11 to be formed as a single integral layer of a material generally having a low surface energy, but having a high surface energy on the interface surface engaged by the liquid. Surface coatings of various materials can accomplish this, as can treatments such as oxidation or exposure to plasmas. The interface surface of some low surface energy porous materials such as spun-bonded polyolefin can become higher energy, and therefore more effective as diffusers, by soaking such materials in water for a period of time. The diffuser must have a multitude of fine pores, and these are preferably uniform in size and distribution for dividing the gas flow into a multitude of tiny seeps through the diffuser. The diffuser must also be strong enough to contain the gas within a gap 16, 27, 37 underneath the diffuser and must be resistant to both the gas and the liquid.

Diffuser 11 can also be formed of a single layer of a uniformly finely porous and preferably high surface energy material. Strength, materials resistance, and uniform distribution of fine pores are important for a successful diffuser. A single layer of a porous, high surface energy material can work well as a diffuser, but lacks resistance to water penetration if the gas flow is stopped. Such a diffuser is preferably combined with a check valve arranged upstream or in an underlying layer for resisting backflow when gas inflow stops. A variety of check valves are available and useable for such a purpose, including umbrella valves, reed valves, slit elastomer valves, and many others. A suitable check valve can perform the low surface energy layer's function of resisting liquid backflow into the gas inlet line but may be less effective in reducing penetration of liquid and liquid-borne contaminates into diffuser pores. A diffuser without a low surface energy layer is preferably adequately strong to resist gas pressure and is uniformly finely porous.

The embodiment of a sparger 50 in FIG. 9 schematically illustrates the possibility of a check valve 55 arranged in an underlying layer 52 to which an overlying diffuser 51 is bonded. Check valve 55 is preferably combined with gas flow inlet 15, and the bonding of diffuser 51 to underlying layer 52 can be accomplished by any of the expedients described below. A check valve may be useful in conjunction with a backflow resisting low surface energy layer to prevent backflow in cases where water pressure may exceed the resistance capability of the low surface tension layer or may unduly stress the porous layers after gas flow is stopped.

When diffuser 11 is formed of two layers 13 and 14, these are preferably bonded together as schematically shown in FIGS. 7 and 8. For sparger purposes, multiple layers of diffuser 11 preferably act as a single integral layer so that bonding layers 13 and 14 together preferably unites them intimately. Gas flow through layers 13 and 14 preferably proceeds straight through these layers in a direction normal to their plane, and lateral gas flow between layers 13 and 14 is to be avoided. Besides the bonding, which tends to secure this result, making layer 13 somewhat more porous than layer 14 is also desirable. Then, gas flowing through layer 14 does not meet increased resistance in passing through layer 13 and so is inclined to flow straight through layer 13, rather than dispersing laterally between layers 13 and 14.

I prefer that the bonding between layers 13 and 14 use a multitude of adhesive dots 16 arranged in a regular array, as shown in FIGS. 7 and 8. Many different array patterns can be used, and spacing between adhesive dots can be varied within the objectives of securely bonding layers 13 and 14 together while blocking off as little as possible of the area of diffuser 11 available to through flow of gas. Since lateral gas flow is not desired between layers 13 and 14, the bonding array pattern can include closed figures such as circles or squares. Grid and crosshatch patterns are also possible, and satisfactory bonding patterns are limited only by the desirability of minimizing bonding areas while maximizing an intimate interconnection between layers 13 and 14.

A preferred way to accomplish the necessary bonding is with a highly viscous adhesive that does not wick and does not flow outwardly or through layers 13 and 14. Besides securing a reliable bond between the layers, an adhesive dot or line should be as small as practical and should remain small when the layers are pressed together with the adhesive pattern between them. This can be accomplished by gravure printing the adhesive lines or dots 16 onto one of the layers 13 or 14 and then pressing the layers together over the printed pattern. The resulting laminate 11 has layers that are substantially unified and remain substantially pervious to through flow of gas.

Underlying Layer

One purpose of a layer underlying a diffuser in my sparger is to confine an inflowing gas to a gap region under the diffuser so that a gas cannot escape by any route other than passing through the diffuser and into the liquid as fine bubbles. The underlying layer can add weight to keep the diffuser submerged beneath the liquid and can also help the diffuser maintain a flat profile during operation. A gas inlet 15 directs inflowing gas into a gap region 16, 27, 37 between the underlying layer and the diffuser, and an inlet can be manifolded or multiplied in a variety of ways.

The rigid underlying layer 12 of the embodiment of FIG. 1 is one of several possibilities. Element 12 can be made of metal, plastic, ceramic, glass, concrete, and other materials offering several advantages. These include holding diffuser 11 flat by providing a rigid flat surface to which diffuser 11 is bonded. Layer 12 can also provide weight necessary for sinking sparger 10 to the bottom of a tank or pond of liquid to receive bubbles. A rigid underlying layer 12 also offers structural support, allowing diffuser 11 to be thinner and more flexible, and possibly accommodating a check valve in gas inlet 15.

Flexibility and light weight are also desirable for a sparger, especially since these characteristics tend to contribute to low cost. An example of a flexible and lightweight sparger 20 using layer 22 underlying diffuser 21 is shown in FIG. 5. Underlying layer 22 is preferably formed of thin sheet resin material; and in the embodiment illustrated in FIG. 5, layer 22 is embossed or is otherwise formed with bumps or projections 26 that are involved in bonding layers 21 and 22 together, as explained in more detail below.

Weights 25 are combined with underlying layer 22 to counteract buoyancy. Flexibility and light weight can allow folding or rolling of a large area sparger, to facilitate handling and maintenance.

The sparger 30 of FIG. 6 illustrates the possibility of the underlying layer being formed of multiple layers and materials. The layer 32 underlying diffuser 31 has a sublayer 33 bonded to layer 32 along spaced-apart parallel lines 34 that form weight pockets 36. These can be filled with an inexpensive material such as sand 35 that counteracts buoyancy of sparger 30.

Bonding of Diffuser and Underlying Layer

The diffuser and the underlying layer are bonded together around their periphery so that the gas-impervious underlying layer confines inflowing gas to the underside of the diffuser.

These layers are also bonded together within their periphery in a pattern of bonding regions that allows gas to flow throughout a gap 16, 27, 37 between the diffuser and the underlying layer. The bonding pattern also keeps the diffuser and the underlying layer substantially parallel with each other throughout the gap 16, 27, 37 so that the diffuser does not substantially billow and the gap 16, 27, 37 thickness is kept close to a minimum.

Many bonding arrangements and patterns can be chosen to accomplish these objectives. A bonding pattern of short adhesive lines 41, for example, bonds diffuser 11 to rigid element 12 in the sparger 10 of FIGS. 1 and 2. Short bonding lines 41 are arranged within a perimeter bond 40 so that inflowing gas can pass around and between bonding lines 41 and extend throughout the unbonded area within peripheral bond 40. Bonding lines 41 are preferably no closer than necessary to keep diffuser 11 from substantially billowing. The space or distance between bonding lines or dots depends partly on the strength and stretchiness of diffuser 11, sincethese characteristics allow a strong and substantially unstretchable diffuser to span a longer distance between bonding regions and require a weaker or a more stretchable diffuser to span shorter distances between bonding regions.

Some discernible billowing of the diffuser between bonding regions is unavoidable, but this is preferably minimized by spacing bonding regions close enough together. The preferred maximum allowable billowing of diffuser 11 between bonding lines 41 is schematically illustrated in FIG. 10. From a line a extending between a pair of adjacent bonding regions 41, the maximum billowing height b of diffuser 11 is preferably limited to about 6 mm, regardless of the distance spanned between bonding regions. Height b can also be considered the gap height between a diffuser and an underlying layer (not shown in FIG. 10), and such a gap height is also preferably limited to a maximum of about 6 mm. Since gap height is partly a function of the stretching capacity of a diffuser spanning a distance between bonding lines 41, height b also relates to the length of line a. The preferred relationship in these terms is that the gas pressure responsive increase in diffuser height b above line a extending between bonding regions 41 should not exceed the greater of about 30% of the length of line a, or about 6 mm.

Billowing of a diffuser between bonding regions also affects peeling force that the diffuser can apply to bonding regions in response to pressure of inflowing gas beneath a diffuser. It is desirable to keep bond peeling forces at low angles, since bonding regions may have less resistance to peeling forces than to forces applied in tension. For this reason, I prefer that an angle α of diffuser 11 above line a between bonding regions does not exceed about 30°. This is especially applicable to longer diffuser spans between adjacent bonding regions, since longer spans subject a greater area of a diffuser span to gas pressure, which thereby increases peeling force.

Close spacing of bonding lines 41 has several advantages. It distributes the bonding strength periodically and uniformly throughout the gap area of the sparger; and it tends to keep diffuser 11 nearly flat and unbillowed, as it spans short distances between bond lines 41. Also, bonds generally have more tensile strength than peel strength so that keeping the diffuser nearly flat avoids subjecting the bonds to peeling force. Keeping the diffuser nearly flat, rather than allowing the diffuser to billow to a greater height between more widely spaced bond regions, launches the bubbles into the liquid from a plane surface approximately perpendicular to the bubble rise direction, which helps avoid bubble coalescence. A highly billowed diffuser launches bubbles from diffuser surfaces that slope relative to the bubble rise direction, which encourages bubbles launched from lower levels to coalesce with bubbles departing at higher levels. Also, gas tends to concentrate in the highest regions of a billowed diffuser where the hydraulic pressure is lowest. Both of these factors reduce the uniformly wide distribution of fine bubbles. Finally, short spans between bonding regions reduce the material strength necessary for a diffuser to withstand the pressure of gas in the underlying gap 16, 27, 37. Gas pressure applied to smaller areas between bonding regions requires less strength in both the diffuser and the bonds.

A multitude of variations of patterns of short bonding lines are possible, as suggested by the embodiment of FIG. 3, where bonding lines 41 are arranged in a herringbone pattern. A gas inlet 15 is arranged in a sparger end region, and gas flows around and between the angled bonding lines to extend throughout the gap area within the peripheral bond 42.

Dot-shaped bonding regions 43 can be substituted for short bonding lines, as suggested in the embodiment of FIG. 4. Like bonding lines 41, bonding points 43 are spaced close enough to avoid any substantial diffuser billowing, as explained above.

One configuration of bonding pattern to be avoided is closed figures such as circles or squares that would exclude gas from flowing to diffuser regions within the closed figures. Besides allowing gas to flow throughout a gap underlying a diffuser, a bonding pattern should occupy a minimum area of a diffuser, leaving a maximum area available for through flow of gas and formation of fine bubbles.

Adhesives used for bonding lines or dots are preferably viscous and non-wicking so as to block as few as possible of the diffuser pores and to ensure that the adhesive does not pass through the diffuser. Adhesive reaching the liquid interface surface of the diffuser is undesirable because it lowers the surface energy and increases the bubble size.

Bonding regions between a diffuser and an underlying layer need not necessarily be adhesive. Solvent bonds and thermal welds are also possible. To be avoided, however, is clamping or fastening arrangements that extend something above the upper, liquid interface surface of the diffuser. Any screw head, staple, clamping bar, or the like disposed at and above the diffuser surface provides a low surface tension area that causes tiny bubbles to coalesce into larger bubbles before departing from the diffuser surface. A peripheral clamp is a possible exception, especially if a wide peripheral bond 40 is used between the diffuser and the underlying element so that a peripheral clamp does not extend into the bubble-producing area of the diffuser within the peripheral bond.

Some form of spacing can be arranged between a diffuser and an underlying layer to establish a desired minimum thickness for a gap between these two. I prefer that gap thickness be no more than about 6 mm; and much thinner gaps are preferred, so long as the gap itself does not offer excessive resistance to flow of gas throughout the gap. A bonding region pattern formed by adhesive, and especially by a highly viscous adhesive, can serve as a thin spacer that keeps a diffuser and an underlying layer separated enough to permit inflowing gas to spread widely throughout the unbonded diffuser region.

Another way of assuring a minimum gap thickness is illustrated in FIG. 5 by the embossed projections 26 formed in underlying layer 22. Projections 26 are preferably arranged in a bonding pattern of short lines or dots, such as previously explained, so that gas can flow between and around projections 26 in a gap 27 formed by the presence of the projections 26. Diffuser 21 is then bonded by adhesive, solvent, or thermal welding to the peaks of projections 26. Similar projections can be formed on diffuser 21 to extend downward to points of engagement and bonding with a flat underlying layer.

Another way of establishing minimum gap thickness is illustrated in the sparger 30 of FIG. 6. There, spacers 39 are disposed between diffuser 31 and underlying layer 32 where they are bonded to each layer to establish bonded connections between the layers. Spacers 39 can be formed of a variety of materials and made in many configurations that allow gas to flow around spacers 39 in a gap 37 formed by the presence of the spacers 39 and allow secure bonds between the diffuser and the underlying layer via the interposed spacers. An array of spacers 39 can be interconnected, for example, by elements thinner than the gap thickness so that spacer interconnecting elements do not inhibit gas flow throughout the sparger area. Spacers 39 can also be selected of materials that facilitate bonding to both the diffuser and the underlying layer. For example, an array of spacers 39 can be formed of a material that softens and bonds at temperatures lower than the corresponding softening temperatures of the diffuser and the underlying layer. Any spacer arrangement preferably holds the gap 37 to a minimum workable height, just as diffuser billowing is preferably minimized. The optimum is a thin and unbillowed, but workable, gap 37.

Careful selection and combination of sparger materials to meet the requirements explained above can produce large area spargers that are economical, lightweight, flexible, and easy to handle. In operation, such spargers can be highly efficient by requiring little energy to force gas through the diffuser and by effectively dividing the gas flow into a great multitude of tiny bubbles. A sparger made according to my invention can be economical in minimizing the amount of gas required, maximizing the effect of the gas that is used, and distributing this effect widely within a volume of liquid.

I claim:

1. In a sparger for bubbling gas into a liquid below the liquid surface, the improvement comprising:
    a. a thin, flat gas-permeable diffuser bonded to an underlying layer to leave an unbonded gap that receives inflowing gas and allows inflowing gas to escape only through the diffuser, the gap being a space created by a separation between the underlying layer and the diffuser, the gap having a height measured in a direction substantially perpendicular to the diffuser and the underlying layer, at least a portion of the gap being present at all times before, during, and after operation of the diffuser;
    b. the diffuser and the underlying layer being bonded together in spaced-apart bonding regions;
    c. the bonding regions being configured and spaced apart along a plane substantially parallel to the underlying layer and the diffuser to form the gap, the gap including areas between bonding regions, the bonding regions further being configured to allow the inflowing gas to flow around bonding regions and fill all the gap within the periphery that is not occupied by the bonding regions; and
    d. the bonding regions being spaced relative to strength and stretchiness of the diffuser so that a height increase of the gap from pressure of the inflowing gas does not exceed the greater of about 6 mm or about 30% of the space between adjacent bonding regions, thereby minimizing billowing of the diffuser during operation of the sparger and greatly reducing aggregation of bubbles emanating from the diffuser.

2. The improvement of claim 1 wherein the gap height increase is less than about 6 mm.

3. The improvement of claim 1 wherein the diffuser and the underlying layer are both flexible.

4. The improvement of claim 1 including spacers establishing a thickness of the gap between the diffuser and the underlying layer.

5. The improvement of claim 1 wherein no sparger element extends above a liquid interface surface of the diffuser within a peripheral bond.

6. The improvement of claim 1 wherein the diffuser is formed of a high surface energy layer bonded to a low surface energy layer.

7. The improvement of claim 6 wherein the bonding of the diffuser layers occurs in a multitude of tiny regions.

8. The improvement of claim 7 wherein the bonding of the diffuser layers substantially restricts lateral flow of gas between the diffuser layers.

9. The improvement of claim 1 wherein the diffuser has a high surface energy interface surface with the liquid and a low surface energy interface with the gas.

10. The improvement of claim 1 including an element arranged for resisting liquid backflow through the diffuser when inflow of the gas is stopped.

11. The improvement of claim 10 wherein the backflow resisting element is a check valve arranged in the underlying layer.

12. The improvement of claim 11 wherein the diffuser has a high surface energy interface surface with the liquid.

13. A gas-to-liquid sparger comprising:
    a. an underlying element confining an inflow of gas to a gap between the underlying element and a flat underside of a superposed diffuser, the gap being a space created by a separation between the underlying layer and the diffuser, the gap having a height measured in a direction substantially perpendicular to the diffuser and the underlying layer, at least a portion of the gap being present at all times before, during, and after operation of the diffuser;
    b. the underlying element and the diffuser being bonded together around a periphery of the sparger surrounding the gap and periodically in a plurality of bonding regions spaced apart along a plane substantially parallel to the diffuser and the underlying layer within the gap, the gap including areas between bonding regions; and
    c. the gap bonding regions being configured and spaced to allow inflowing gas to spread around the gap bonding regions and throughout the gap not occupied by bonding regions.

14. The sparger of claim 13 wherein the height of the diffuser above a line between bonding regions does not exceed the greater of about 6 mm or about 30% of the space between adjacent bonding regions.

15. The sparger of claim 13 wherein the underlying element and the diffuser are both flexible.

16. The sparger of claim 13 wherein a weight is combined with the underlying element to prevent the sparger from floating in the liquid.

17. The sparger of claim 13 including spacers that establish thickness of the gap.

18. The sparger of claim 13 wherein no sparger element extends above an upper surface of the diffuser within an area of the upper surface under which the gap lies.

19. The sparger of claim 13 wherein the diffuser is formed of a high surface energy layer bonded to a low surface energy layer.

20. The sparger of claim 19 wherein the bonding of the diffuser layers occurs in a multitude of tiny regions.

21. The sparger of claim 20 wherein the bonding of the diffuser layers substantially restricts lateral flow of gas between the diffuser layers.

22. The sparger of claim 13 wherein the diffuser has a high surface energy interface surface with the liquid and a low surface energy interface with the gas.

23. The sparger of claim 13 including an element arranged for resisting backflow of gas delivered to the gap.

24. The sparger of claim 23 wherein the backflow resisting element is a check valve arranged in the underlying layer.

25. The sparger of claim 24 wherein the diffuser has a high surface energy interface surface with the liquid.

26. A gas-to-liquid sparger comprising:
  a. a thin diffuser and a thin element underlying the diffuser being bonded together to leave a thin gap between the diffuser and the underlying element, the gap being a space created by a separation between the thin element and the diffuser, the gap having a height measured in a direction substantially perpendicular to the diffuser and the thin element, at least a portion of the gap being present at all times before, during, and after operation of the diffuser;
  b. the bonding of the diffuser and the underlying element being continuous around a periphery of the sparger and intermittent along a plane substantially parallel to the diffuser and the thin element throughout the gap within the periphery in a configuration that allows inflowing gas to spread throughout the unbonded parts of the gap within the periphery, the gap including areas between bonding regions; and
  c. the bonding regions being arranged for keeping the diffuser close enough to the underlying element during operation of the sparger to avoid applying peeling force at an angle of more than about 30° to a line extending between adjacent bonding regions, thereby minimizing billowing of the diffuser during operation of the sparger and greatly reducing aggregation of bubbles emanating from the diffuser.

27. The sparger of claim 26 wherein no sparger element extends above an upper surface of the diffuser within an area of the upper surface under which the gap lies.

28. The sparger of claim 26 wherein a weight combined with the underlying element prevents the sparger from floating.

29. The sparger of claim 26 wherein the sparger and the underlying element are both flexible.

30. The sparger of claim 26 including spacers that establish a thickness of the gap.

31. The sparger of claim 26 wherein the diffuser is formed of a high surface energy layer bonded to a low surface energy layer.

32. The sparger of claim 31 wherein the diffuser layers are bonded in a multitude of tiny regions.

33. The sparger of claim 32 wherein the bonding of the diffuser layers substantially restricts gas from flowing laterally between the diffuser layers.

34. The sparger of claim 26 wherein the diffuser has a high surface energy interface surface with the liquid and a low surface energy interface with the gas.

35. The sparger of claim 26 wherein the inflowing gas is inhibited from backflowing.

36. The sparger of claim 35 including a check valve combined with the underlying element to prevent gas backflow.

37. The sparger of claim 36 wherein the diffuser has a high surface energy interface surface with the liquid.

38. The sparger of claim 26 wherein the height of the gap rising above the line between bonding regions in response to pressure from the inflowing gas is no more than the greater of about 6 mm or about 30% of the distance between adjacent bonding regions.

39. A gas-to-liquid sparger comprising:
  a. a diffuser formed of a thin upper layer of a gas-permeable, high surface energy material and a thin lower layer of a gas-permeable, low surface energy material bonded together in a multitude of tiny regions;
  b. the bonding of the diffuser layers together substantially restricting gas from flowing laterally between the layers while allowing gas to flow directly through both layers in more than half of the total diffuser area;
  c. the diffuser being bonded to an underlying element that confines an inflow of gas to the underside of the diffuser; and
  d. the bonding of the underlying element and the diffuser being arranged for holding the underlying element and the diffuser substantially together on opposite sides of a thin gap configured to allow inflowing gas to spread throughout the gap, the gap being a space created by a separation between the underlying element and the diffuser, the gap having a height measured in a direction substantially perpendicular to the diffuser and the underlying element, at least a portion of the gap being present at all times before, during, and after operation of the diffuser.

40. The sparger of claim 39 wherein a gap distance between the diffuser and the underlying layer is less than about 6 mm.

41. The sparger of claim 39 wherein bonding regions between the diffuser and the underlying element are spaced relative to strength and thickness of the diffuser so that a height increase of the gap from pressure of inflowing gas does not exceed the greater of about 6 mm or about 30% of the space between adjacent bonding regions.

42. The sparger of claim 39 wherein a weight combined with the underlying element prevents the sparger from floating.

43. The sparger of claim 39 wherein the sparger and the underlying element are both flexible.

44. The sparger of claim 39 wherein no sparger element extends above an upper surface of the diffuser within an area of the upper surface under which the gap lies.

45. In a sparger having a double-layer diffuser arranged with a high surface energy layer at an interface with a liquid into which a gas is bubbled and a low surface energy layer at an interface with the gas that is bubbled into the liquid, the improvement comprising:
  a. the high surface energy layer and the low surface energy layer being bonded together in a multitude of tiny regions configured and spaced so that gas permeates a major area of both layers without flowing laterally between the layers;
  b. the diffuser being bonded to an underlying layer that confines inflowing gas within a thin gap bounded by the underlying layer and the low surface tension layer, the gap being a space created by a separation between the underlying layer and the diffuser, the gap having a height measured in a direction substantially perpendicular to the diffuser and the underlying layer, at least a portion of the gap being present at all times before, during, and after operation of the diffuser; and c. the bonding regions between the diffuser and the underlying layer being spaced apart along a plane substantially parallel to the underlying layer and the diffuser and being spaced close enough together to keep the diffuser flat enough during operation so that a height increase of the gap from pressure of the inflowing gas does not exceed the greater of about 6 mm or about 30% of the space between adjacent bonding regions, thereby minimizing billowing of the diffuser during operation of the sparger and greatly reducing aggregation of bubbles emanating from the diffuser.

46. The improvement of claim 45 wherein the height of the gap is no more than about 6 mm.

47. The improvement of claim 45 wherein no sparger element extends above an upper surface of the diffuser within an area of the upper surface under which the gap lies.

48. The improvement of claim 45 wherein a weight combined with the underlying element prevents the sparger from floating.

49. The improvement of claim 45 wherein the sparger and the underlying element are both flexible.

* * * * *